United States Patent
Ma (10) Patent No.: US 12,193,060 B2
(45) Date of Patent: Jan. 7, 2025

(54) RANDOM ACCESS METHOD AND APPARATUS, AND COMMUNICATIONS DEVICE

(71) Applicant: VIVO MOBILE COMMUNICATION CO., LTD., Guangdong (CN)

(72) Inventor: Yue Ma, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 486 days.

(21) Appl. No.: 17/383,531

(22) Filed: Jul. 23, 2021

(65) Prior Publication Data
US 2021/0352733 A1  Nov. 11, 2021

Related U.S. Application Data

(63) Continuation of application No. PCT/CN2020/073513, filed on Jan. 21, 2020.

(30) Foreign Application Priority Data

Jan. 25, 2019  (CN) .......................... 201910075330.X (51) Int. Cl.
*H04W 74/0833*  (2024.01)
*H04W 72/23*  (2023.01)

(52) U.S. Cl.
CPC .............. *H04W 74/0833* (2013.01)

(58) Field of Classification Search
None
See application file for complete search history.

(56) References Cited

U.S. PATENT DOCUMENTS

| 11,129,201 B2* | 9/2021 | Martin ............. H04W 74/0833 |
| 2016/0309518 A1 | 10/2016 | Patel et al. |
| 2018/0110074 A1* | 4/2018 | Akkarakaran ........ H04W 72/21 |
| 2018/0205516 A1 | 7/2018 | Jung et al. |
| 2018/0227805 A1 | 8/2018 | Jang et al. |
| 2019/0075598 A1* | 3/2019 | Li ..................... H04W 74/0833 |
| 2019/0132882 A1* | 5/2019 | Li ..................... H04W 74/0833 |
| 2019/0357265 A1 | 11/2019 | Ren et al. |

(Continued)

FOREIGN PATENT DOCUMENTS

| CA | 3121400 A1 * | 6/2020 | .......... H04B 17/309 |
| CN | 101883397 A | 11/2010 | |

(Continued)

OTHER PUBLICATIONS

Vivo, "Selection Between 2-step and 4-step RACH," 3GPP TSG-RAN WG2 Meeting #106, R2-1905653, Reno, USA May 13-17, 2019 (2 pages).

(Continued)

*Primary Examiner* — Duc T Duong
(74) *Attorney, Agent, or Firm* — Price Heneveld LLP (57) ABSTRACT

A random access method and apparatus, and a communications device are provided, and relates to the field of wireless communications technologies. The random access method includes: receiving, by a terminal, random access configuration information from a network side device, wherein the random access configuration information comprises at least a random access threshold; and selecting, by the terminal, a random access manner according to the random access configuration information.

20 Claims, 3 Drawing Sheets

(56) References Cited

U.S. PATENT DOCUMENTS

| | | | |
|---|---|---|---|
| 2020/0146069 A1* | 5/2020 | Chen | H04W 52/362 |
| 2020/0404711 A1* | 12/2020 | Zhao | H04W 80/02 |
| 2021/0168857 A1* | 6/2021 | Wang | H04W 74/0833 |
| 2021/0176781 A1* | 6/2021 | Wang | H04W 74/006 |
| 2021/0219348 A1* | 7/2021 | Zhang | H04W 72/0446 |
| 2021/0219349 A1* | 7/2021 | Huang | H04W 74/0833 |
| 2021/0243814 A1* | 8/2021 | Zhang | H04W 74/0833 |
| 2021/0289560 A1* | 9/2021 | Xu | H04W 24/08 |
| 2021/0329704 A1* | 10/2021 | Yang | H04W 72/23 |
| 2021/0345412 A1* | 11/2021 | Frederiksen | H04W 74/0833 |
| 2021/0385869 A1* | 12/2021 | Hong | H04W 74/006 |
| 2021/0392690 A1* | 12/2021 | Hong | H04W 74/0833 |
| 2022/0095379 A1* | 3/2022 | Xiong | H04W 74/0833 |
| 2022/0279597 A1* | 9/2022 | Takeda | H04L 1/189 |

FOREIGN PATENT DOCUMENTS

| | | |
|---|---|---|
| CN | 106550426 A | 3/2017 |
| CN | 108282895 A | 7/2018 |

OTHER PUBLICATIONS

Motorola Mobility, Physical channel design for 2-step RACH, 3GPP TSG RAN WG1 Meeting AH 1801, R1-1800727, Vancouver, Canada, Jan. 22-26, 2018.

* cited by examiner

RANDOM ACCESS METHOD AND APPARATUS, AND COMMUNICATIONS DEVICE

CROSS-REFERENCE TO RELATED APPLICATIONS

This application is continuation application of PCT International Application No. PCT/CN2020/073513 filed on Jan. 21, 2020, which claims priority to Chinese Patent Application No. 201910075330.X, filed on Jan. 25, 2019 in China, the disclosures of which are incorporated herein by reference in their entireties.

TECHNICAL FIELD

The present disclosure relates to the field of wireless communications technologies, and in particular, to a random access method and apparatus, and a communications device.

BACKGROUND

A random access procedure of a terminal (UE) has two types: four-step random access (4-step RACH) and two-step random access (2-step RACH).

If a cell supports both 2-step RACH and 4-step RACH, how to select a manner for a terminal having both capabilities of 4-step RACH and 2-step RACH to perform random access becomes a problem to be resolved. The 2-step RACH is more valuable in some scenarios due to a fast access speed, while the 4-step RACH, as an existing mechanism, needs a backup mechanism for fallback. However, due to a limited capacity of each access mechanism, how to properly allocate the two access mechanisms and prevent a RACH resource from being restricted needs to be considered.

SUMMARY

Embodiments of the present disclosure provide the following technical solutions:

According to a first aspect, an embodiment of the present disclosure provides a random access method, including:

receiving, by a terminal, random access configuration information from a network side device, where the random access configuration information includes at least a random access threshold; and selecting, by the terminal, a random access manner according to the random access configuration information.

According to a second aspect, an embodiment of the present disclosure provides a random access method, including:

sending, by a network side device, random access configuration information to a terminal, where the random access configuration information includes at least a random access threshold.

According to a third aspect, an embodiment of the present disclosure provides a random access apparatus, including:

a receiving module configured to receive random access configuration information from a network side device, where the random access configuration information includes at least a random access threshold; and a processing module configured to select a random access manner according to the random access configuration information.

According to a fourth aspect, an embodiment of the present disclosure provides a random access apparatus, including:

a sending module configured to send random access configuration information to a terminal, where the random access configuration information includes at least a random access threshold.

According to a fifth aspect, an embodiment of the present disclosure provides a communications device, including a processor, a memory, and a computer program that is stored on the memory and capable of running on the processor, and when the computer program is executed by the processor, the steps of the random access method described above are implemented.

According to a sixth aspect, an embodiment of the present disclosure provides a computer-readable storage medium, where the computer-readable storage medium stores a computer program, and when the computer program is executed by a processor, the steps of the random access method described above are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and those of ordinary skill in the art can still derive other drawings from these accompanying drawings.

DETAILED DESCRIPTION OF EMBODIMENTS

To make the technical problems to be resolved, the technical solutions, and the advantages in the embodiments of the present disclosure clearer, the detailed description is provided below with reference to the accompanying drawings and specific embodiments.

A random access procedure of a terminal (User Equipment, UE) has two types: four-step random access and two-step random access.

The four-step random access refers to a general RACH procedure in the related art as follows: 1) UE sends an MSG1 (preamble); 2) the UE receives a random access response RAR sent by a network (the RAR is scrambled using an RA-RNTI and contains a BI, a UL grant, a RAPID, a TC-RNTI, etc.); 3) UE that detects a RAPID corresponding to a preamble sent by the UE sends an MSG3 according to a location of the UL grant (UE that has not detected a RAPID sent by the UE uses the BI for delayed access); 4) the UE receives an MSG4 (including a contention resolution ID with the TC-RNTI upgraded to a C-RNTI) sent by the network side, and the network side can subsequently use the C-RNTI to schedule the UE; and 5) generally, the UE needs to send an MSG5, an access complete message. The four-step access mainly refers to the process of contention resolution completion in the first four steps, and usually represents a random access procedure of a conventional wireless network.

Furthermore, for the four-step random access (4-step RACH), the random access procedure of the UE includes:
 A. a contention based random access procedure; and
 B. a non-contention based random access procedure.

In the "contention based random access procedure", the UE sends an Msg1 (random access request) to a network side device, and after receiving the Msg1, the network side device sends an Msg2 (random access response (RAR)) to the UE, where the message carries uplink grant information. The UE performs a medium access control (MAC) layer packet assembly function based on the uplink grant in the Msg2, to generate a MAC protocol data unit (PDU), and stores the MAC PDU in an Msg3 buffer. Then, the UE sends the MAC PDU in the Msg3 buffer through a hybrid automatic repeat request (HARQ) process. The network side device sends an Msg4 (for example, a contention resolution identifier) to the UE after receiving the Msg3. The UE receives the Msg4 and determines whether contention resolution succeeds. If the contention resolution succeeds, the random access procedure succeeds. Otherwise, the UE re-initiates a random access procedure. In the re-initiated random access procedure, when the UE receives the uplink grant in the Msg2 again, the UE directly retrieves the previously stored MAC PDU from the Msg3 buffer and sends the MAC PDU through the HARQ process. After completing the random access procedure, the UE clears the HARQ buffer for transmission of the Msg3 in the random access procedure.

In the "non-contention based random access procedure", the UE sends an Msg1 (random access request) to the network side device. After receiving the Msg1, the network side device sends an Msg2 (random access response) to the UE, where the message carries uplink grant information and identification information of the UE (for example, an index of a random access preamble of the Msg1). If the index of the random access preamble is the same as an index of a random access preamble sent in the Msg1 from the UE, the UE considers that the random access procedure is successful; otherwise, the UE re-initiates a random access procedure.

Each time when the UE initiates (or re-initiates) a random access procedure, the UE selects a random access resource based on downlink signal quality corresponding to each random access Msg1 resource (for example, reference signal received power (RSRP) of a synchronization signal block (SSB)), to improve a success rate of random access. Therefore, each time when the UE initiates (or re-initiates) a random access procedure, the UE may select a "contention based random access procedure" or a "non-contention-based random access procedure".

Figure 1:
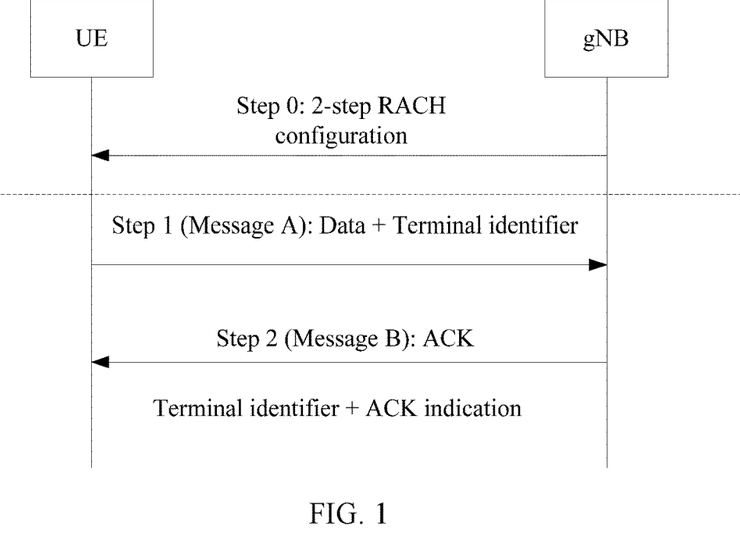
FIG. 1 is a schematic flowchart of two-step random access.

As shown in FIG. 1, the two-step random access (2-step RACH) includes the following steps:

Step 0: A network side device (gNB) configures two-step random access configuration information for UE, for example, including transmission resource information corresponding to an MsgA and an MsgB.

Step 1: The UE triggers a 2-step RACH procedure, and sends request information (for example, the MsgA) to the network side device, for example, by using a physical uplink shared channel (PUSCH) and a preamble.

Step 2: The network side device sends acknowledgment information (MsgB) to the UE, and if the UE fails to receive the MsgB ("fail" means that the UE does not receive an RAR ID or a contention resolution ID corresponding to the MsgA sent by the UE itself), the UE resends an Msg1 (or may resend the MsgA, an Msg3, or the Msg1, depending on specific solutions).

Conventionally, for ease of understanding, the MsgA of 2-step includes the Msg1 and the Msg3 of 4-step, and the MsgB of 2-step includes the Msg2 and the Msg4 of 4-step.

If a cell supports both 2-step RACH access and 4-step RACH access, how to select a manner for a terminal having both capabilities to perform random access will become a problem to be resolved. The 2-step RACH is more valuable in some scenarios due to a fast access speed, while the 4-step RACH, as an existing mechanism, needs a backup mechanism for fallback. However, due to a limited capacity of each access mechanism, how to properly allocate the two access mechanisms and prevent a RACH resource from being restricted has also become a problem to be considered.

To resolve the foregoing problems, the embodiments of the present disclosure provide a random access method and apparatus, and a communications device, so that a probability of random access collisions can be reduced, thereby ensuring communication quality of a terminal.

Figure 2:
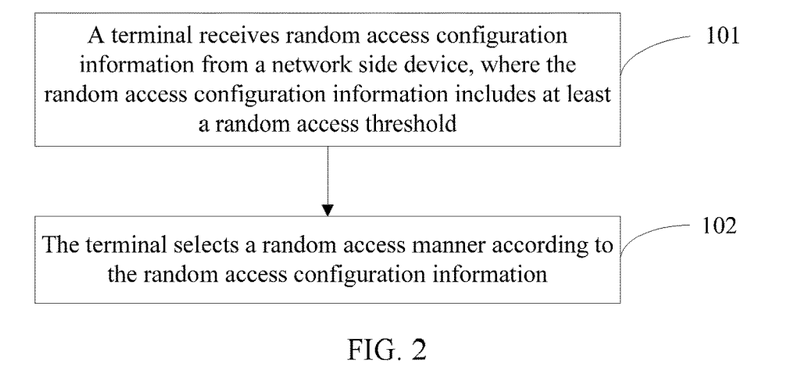
FIG. 2 is a schematic flowchart of a random access method according to an embodiment of the present disclosure.

An embodiment of the present disclosure provides a random access method. As shown in FIG. 2, the method includes:

Step 101: A terminal receives random access configuration information from a network side device, where the random access configuration information includes at least a random access threshold.

Step 102: The terminal selects a random access manner according to the random access configuration information.

In this embodiment, the terminal receives the random access configuration information from the network side device, and selects the random access manner according to the random access configuration information, so that users using the 2-step RACH and the 4-step RACH in a system can be properly distributed in quantity, and a probability of random access collisions is reduced, thereby ensuring communication quality of the terminal.

In a specific embodiment, the random access manner includes a four-step random access manner and a two-step random access manner, and the selecting, by the terminal, a random access manner according to the random access configuration information includes:

generating, by the terminal, a random access parameter, comparing the random access parameter with the random access threshold, and selecting the four-step random access manner or the two-step random access manner according to a comparison result.

Specifically, when the random access parameter is greater than the random access threshold, the four-step random access manner may be selected, and when the random access parameter is not greater than the random access threshold, the two-step random access manner is be selected; or when the random access parameter is not less than the random access threshold, the four-step random access manner is selected, and when the random access parameter is less than the random access threshold, the two-step random access manner is selected; or when the random access parameter is greater than the random access threshold, the two-step random access manner is selected, and when the random access parameter is not greater than the random access threshold, the four-step random access manner is selected; or when the random access parameter is not less than the random access threshold, the two-step random access manner is selected, and when the random access parameter is less than the random access threshold, the four-step random access manner is selected.

Further, the generating, by the terminal, a random access parameter includes at least one of the following:

generating, by the terminal, a random number as the random access parameter;

dividing, by the terminal, a terminal identifier exactly by a preset value to obtain the random access parameter; or calculating, by the terminal, the random access parameter by using a redistribution formula, where a calculation parameter of the redistribution formula includes at least one of the following: the terminal identifier, the random access threshold, and the random number.

Further, the random access configuration information further includes a priority of the random access manner, and the priority is determined according to at least one of the following: a service requirement, signal quality, a deployment scenario, a cell size, and channel occupancy information. During selection of a random access manner, a random access manner having a higher priority is preferentially selected. The service requirement refers to quality of service (QoS) of an initiated service, and if a short delay is required, a priority of the two-step random access manner is set to be higher. The signal quality refers to a measured quantity such as reference signal received power (RSRP) of a reference signal measured by the terminal. The deployment scenario indicates whether it is a new radio deployment (NR-U) scenario. The cell size indicates whether the cell is a small cell. The channel occupancy information is used to indicate the current busyness of a channel.

Further, after the selecting, by the terminal, a random access manner according to the random access configuration information, the method further includes:

using, by the terminal, the selected random access manner for $n^{th}$ random access, where n is a positive integer; and after the $n^{th}$ random access fails or is not completed or is unsuccessful, selecting, by the terminal, a random access manner for $(n+1)^{th}$ random access according to any one of the following methods:

selecting the same random access manner as that for the $n^{th}$ random access;

selecting a random access manner different from that for the $n^{th}$ random access;

when both of the two random access manners can meet a preset priority requirement, selecting a random access manner different from that for the $n^{th}$ random access;

after the random access manner for the $n^{th}$ random access has been selected for a preset number of times, selecting a random access manner different from that for the $n^{th}$ random access;

after the random access manner for the $n^{th}$ random access has been selected for a preset number of times, when both of the two random access manners can meet a preset priority requirement, selecting a random access manner different from that for the $n^{th}$ random access;

after the random access manner for the $n^{th}$ random access has been executed for a preset time, selecting a random access manner different from that for the $n^{th}$ random access;

after the random access manner for the $n^{th}$ random access has been executed for a preset time, when both of the two random access manners can meet a preset priority requirement, selecting a random access manner different from that for the $n^{th}$ random access;

selecting a random access manner according to a newly generated random access parameter, where the newly generated random access parameter is less than a random access parameter corresponding to the $n^{th}$ random access, and a difference between the two random access parameters is a specified value; or when both of the two random access manners can meet a preset priority requirement, selecting a random access manner according to the newly generated random access parameter, where the newly generated random access parameter is less than a random access parameter corresponding to the $n^{th}$ random access, and a difference between the two random access parameters is a specified value.

The failed, uncompleted, or unsuccessful random access procedure may be caused by many factors, for example: power ramping of transmission power (including power of a preamble sequence and/or power of a PUSCH) exceeds maximum power; an MSG1/MSGA has been sent more than a preset maximum number of times; and an MSG2/MSGB or MSG4 (contention resolution ID) has not been received before a timeout. Completed random access may also be divided into two types: successfully completed and unsuccessfully completed, and the above-mentioned successfully completed or unsuccessfully "completed" random access is also within the scope of protection of the present disclosure. In addition, problematic (problematic) random access is also within the scope of protection of the present disclosure.

The preset priority requirement is preconfigured, or is configured by the network side device.

Figure 3:
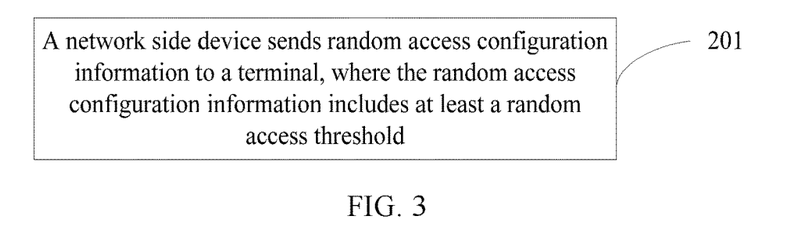
FIG. 3 is a schematic flowchart of a random access method according to another embodiment of the present disclosure.

An embodiment of the present disclosure further provides a random access method. As shown in FIG. 3, the method includes:

Step 201: A network side device sends random access configuration information to a terminal, where the random access configuration information includes at least a random access threshold.

In this embodiment, the network side device sends the random access configuration information to the terminal, and the terminal selects the random access manner according to the random access configuration information, so that users using the 2-step RACH and the 4-step RACH in a system can be properly distributed in quantity, and a probability of random access collisions is reduced, thereby ensuring communication quality of the terminal.

Further, the random access configuration information further includes a priority of the random access manner, and the priority is determined according to at least one of the following: a service requirement, signal quality, a deployment scenario, a cell size, and channel occupancy information. During selection of a random access manner, a random access manner having a higher priority is preferentially selected. The service requirement refers to quality of service (QoS) of an initiated service, and if a short delay is required, a priority of the two-step random access manner is set to be higher. The signal quality refers to a measured quantity such as reference signal received power (RSRP) of a reference signal measured by the terminal. The deployment scenario indicates whether it is a new radio deployment (NR-U) scenario. The cell size indicates whether the cell is a small cell. The channel occupancy information is used to indicate the current busyness of a channel.

The random access method of the present disclosure will be further described below with reference to specific embodiments.

Embodiment 1

In this embodiment, there is an association relationship between a random access manner selected in next random access and a random access manner selected in current random access. This embodiment specifically includes the following steps.

Step 1: A terminal receives random access configuration information from a network side device, where the random access configuration information may include a random access threshold and a priority of a random access manner, and the priority is determined according to at least one of the following: a service requirement, signal quality, a deployment scenario, a cell size, and channel occupancy information. During selection of a random access manner, a random access manner having a higher priority is preferentially selected. The service requirement refers to quality of service (QoS) of an initiated service, and if a short delay is required, a priority of the two-step random access manner is set to be higher. The signal quality refers to a measured quantity such as reference signal received power (RSRP) of a reference signal measured by the terminal. The deployment scenario indicates whether it is a new radio deployment (NR-U) scenario. The cell size indicates whether the cell is a small cell. The channel occupancy information is used to indicate the current busyness of a channel.

Step 2: The terminal selects a random access manner used for $n^{th}$ random access and/or a corresponding RACH occasion (opportunity) according to the random access configuration information, such as the priority or the random access threshold, where n is a positive integer.

Step 3: After the $n^{th}$ random access fails or is not completed or is unsuccessful, continue to perform a random access procedure, and select a random access manner for $(n+1)^{th}$ random access according to any one of the following methods:

If the two-step random access is selected for the $n^{th}$ random access, the two-step random access is still selected for the $(n+1)^{th}$ random access; and if the four-step random access is selected for the $n^{th}$ random access, the four-step random access is still selected for the $(n+1)^{th}$ random access.

If the two-step random access is selected for the $n^{th}$ random access, the fourth-step random access is selected for the $(n+1)^{th}$ random access; and if the four-step random access is selected for the $n^{th}$ random access, the two-step random access is selected for the $(n+1)^{th}$ random access, where both of the two random access manners can meet a preset priority requirement.

If the two-step random access is selected for the $n^{th}$ random access, the two-step random access is still selected for the $(n+1)^{th}$ random access, and after the two-step random access has been selected for a preset number of times or the two-step random access manner has been executed for a preset time, the four-step random access is selected, where both of the two random access manners can meet a preset priority requirement.

If the four-step random access is selected for the $n^{th}$ random access, the four-step random access is still selected for the $(n+1)^{th}$ random access, and after the four-step random access has been selected for a preset number of times or the four-step random access manner has been executed for a preset time, the two-step random access is selected, where both of the two random access manners can meet a preset priority requirement.

If the four-step random access is selected for the $n^{th}$ random access, the same manner as that for the $n^{th}$ random access is selected for the $(n+1)^{th}$ access with a decreasing probability, where the decreasing probability may be broadcast or predefined. For example: a probability of selecting the two-step random access the first time is 1, a probability of selecting the two-step random access the second time is 0.8, a probability of selecting the two-step random access the third time is 0.6, . . . , and so on, where both of the two random access manners can meet a preset priority requirement. Specifically, the probability of the random access manner may be compared with the random access threshold, and the four-step random access manner or the two-step random access manner is selected according to a comparison result.

Embodiment 2

In this embodiment, there is no association relationship between a random access manner selected in next random access and a random access manner selected in current random access. This embodiment specifically includes the following steps.

Step 1: A terminal receives random access configuration information from a network side device, where the random access configuration information may include a random access threshold and a priority of a random access manner, and the priority is determined according to at least one of the following: a service requirement, signal quality, a deployment scenario, a cell size, and channel occupancy information. During selection of a random access manner, a random access manner having a higher priority is preferentially selected. The service requirement refers to quality of service (QoS) of an initiated service, and if a short delay is required, a priority of the two-step random access manner is set to be higher. The signal quality refers to a measured quantity such as reference signal received power (RSRP) of a reference signal measured by the terminal. The deployment scenario indicates whether it is a new radio deployment (NR-U) scenario. The cell size indicates whether the cell is a small cell. The channel occupancy information is used to indicate the current busyness of a channel.

Step 2: The terminal selects a random access manner used for $n^{th}$ random access and/or a corresponding RACH occasion (opportunity) according to the random access configuration information, such as the priority or the random access threshold, where n is a positive integer; and after the $n^{th}$ random access fails or is not completed or is unsuccessful, the terminal continues to perform a random access procedure, where during the selection of the random access manner for the $n^{th}$ random access, if both of the two random access manners can meet a preset priority requirement, the random access threshold used for selecting the random access manner is a random access parameter generated by the terminal, the random access parameter is compared with the random access threshold, and the four-step random access manner or the two-step random access manner is selected according to a comparison result.

A method for generating a random access parameter includes at least one of the following: generating, by the terminal, a random number as the random access parameter; dividing, by the terminal, a terminal identifier exactly by a preset value to obtain the random access parameter; or calculating, by the terminal, the random access parameter by using a redistribution formula, where a calculation parameter of the redistribution formula includes at least one of the following: the terminal identifier, the random access threshold, and the random number.

Specifically, when the random access parameter is greater than the random access threshold, the four-step random access manner may be selected, and when the random access parameter is not greater than the random access threshold, the two-step random access manner is be selected; or when the random access parameter is not less than the random access threshold, the four-step random access manner is selected, and when the random access parameter is less than the random access threshold, the two-step random access manner is selected; or when the random access parameter is greater than the random access threshold, the two-step random access manner is selected, and when the random access parameter is not greater than the random access threshold, the four-step random access manner is selected; or when the random access parameter is not less than the random access threshold, the two-step random access manner is selected, and when the random access parameter is less than the random access threshold, the four-step random access manner is selected.

Figure 4:
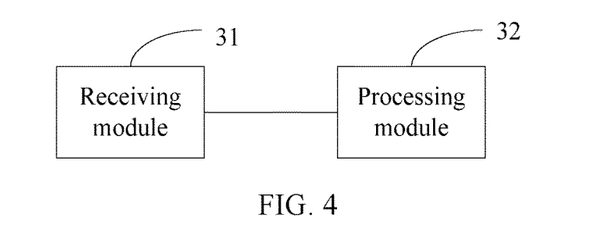
FIG. 4 is a structural block diagram of a random access apparatus according to an embodiment of the present disclosure.

An embodiment of the present disclosure further provides a random access apparatus. As shown in FIG. 4, the apparatus includes:

a receiving module 31 configured to receive random access configuration information from a network side device, where the random access configuration information includes at least a random access threshold; and a processing module 32 configured to select a random access manner according to the random access configuration information.

In this embodiment, the terminal receives the random access configuration information from the network side device, and selects the random access manner according to the random access configuration information, so that users using the 2-step RACH and the 4-step RACH in a system can be properly distributed in quantity, and a probability of random access collisions is reduced, thereby ensuring communication quality of the terminal.

Further, the random access manner includes a four-step random access manner and a two-step random access manner, and the processing module 32 is specifically configured to: generate a random access parameter, compare the random access parameter with the random access threshold, and select the four-step random access manner or the two-step random access manner according to a comparison result.

Specifically, when the random access parameter is greater than the random access threshold, the four-step random access manner may be selected, and when the random access parameter is not greater than the random access threshold, the two-step random access manner is be selected; or when the random access parameter is not less than the random access threshold, the four-step random access manner is selected, and when the random access parameter is less than the random access threshold, the two-step random access manner is selected; or when the random access parameter is greater than the random access threshold, the two-step random access manner is selected, and when the random access parameter is not greater than the random access threshold, the four-step random access manner is selected; or when the random access parameter is not less than the random access threshold, the two-step random access manner is selected, and when the random access parameter is less than the random access threshold, the four-step random access manner is selected.

Further, the processing module 32 is specifically configured to execute at least one of the following steps:

generating a random number as the random access parameter;

dividing a terminal identifier exactly by a preset value to obtain the random access parameter; or calculating the random access parameter by using a redistribution formula, where a calculation parameter of the redistribution formula includes at least one of the following: the terminal identifier, the random access threshold, and the random number.

Further, the random access configuration information further includes a priority of the random access manner, and the priority is determined according to at least one of the following: a service requirement, signal quality, a deployment scenario, a cell size, and channel occupancy information. During selection of a random access manner, a random access manner having a higher priority is preferentially selected. The service requirement refers to quality of service (QoS) of an initiated service, and if a short delay is required, a priority of the two-step random access manner is set to be higher. The signal quality refers to a measured quantity such as reference signal received power (RSRP) of a reference signal measured by the terminal. The deployment scenario indicates whether it is a new radio deployment (NR-U) scenario. The cell size indicates whether the cell is a small cell. The channel occupancy information is used to indicate the current busyness of a channel.

Further, the apparatus further includes:

a random access module configured to use the selected random access manner for $n^{th}$ random access, where n is a positive integer; and after the $n^{th}$ random access fails or is not completed or is unsuccessful, a random access manner for $(n+1)^{th}$ random access is selected according to any one of the following methods:

selecting the same random access manner as that for the $n^{th}$ random access;

selecting a random access manner different from that for the $n^{th}$ random access;

when both of the two random access manners can meet a preset priority requirement, selecting a random access manner different from that for the $n^{th}$ random access;

after the random access manner for the $n^{th}$ random access has been selected for a preset number of times, selecting a random access manner different from that for the $n^{th}$ random access;

after the random access manner for the $n^{th}$ random access has been selected for a preset number of times, when both of the two random access manners can meet a preset priority requirement, selecting a random access manner different from that for the $n^{th}$ random access;

after the random access manner for the $n^{th}$ random access has been executed for a preset time, selecting a random access manner different from that for the $n^{th}$ random access;

after the random access manner for the $n^{th}$ random access has been executed for a preset time, when both of the two random access manners can meet a preset priority requirement, selecting a random access manner different from that for the $n^{th}$ random access;

selecting a random access manner according to the newly generated random access parameter, where the newly generated random access parameter is less than a random access parameter corresponding to the $n^{th}$ random access, and a difference between the two random access parameters is a specified value; or when both of the two random access manners can meet a preset priority requirement, selecting a random access manner according to the newly generated random access parameter, where the newly generated random access parameter is less than a random access parameter corresponding to the $n^{th}$ random access, and a difference between the two random access parameters is a specified value.

Further, the preset priority requirement is preconfigured, or is configured by the network side device.

Figure 5:
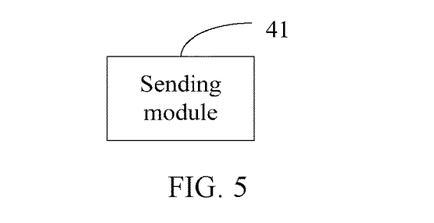
FIG. 5 is a structural block diagram of a random access apparatus according to another embodiment of the present disclosure.

An embodiment of the present disclosure further provides a random access apparatus. As shown in FIG. 5, the apparatus includes:

a sending module 41 configured to send random access configuration information to a terminal, where the random access configuration information includes at least a random access threshold.

In this embodiment, the network side device sends the random access configuration information to the terminal, and the terminal selects the random access manner according to the random access configuration information, so that users using the 2-step RACH and the 4-step RACH in a system can be properly distributed in quantity, and a probability of random access collisions is reduced, thereby ensuring communication quality of the terminal.

Further, the random access configuration information further includes a priority of the random access manner, and the priority is determined according to at least one of the following: a service requirement, signal quality, a deployment scenario, a cell size, and channel occupancy information. During selection of a random access manner, a random access manner having a higher priority is preferentially selected. The service requirement refers to quality of service (QoS) of an initiated service, and if a short delay is required, a priority of the two-step random access manner is set to be higher. The signal quality refers to a measured quantity such as reference signal received power (RSRP) of a reference signal measured by the terminal. The deployment scenario indicates whether it is a new radio deployment (NR-U) scenario. The cell size indicates whether the cell is a small cell. The channel occupancy information is used to indicate the current busyness of a channel.

An embodiment of the present disclosure further provides a communications device, including a processor, a memory, and a computer program that is stored on the memory and capable of running on the processor, and when the computer program is executed by the processor, the steps of the random access method described above are implemented.

The communications device may be a terminal or a network side device.

Figure 6:
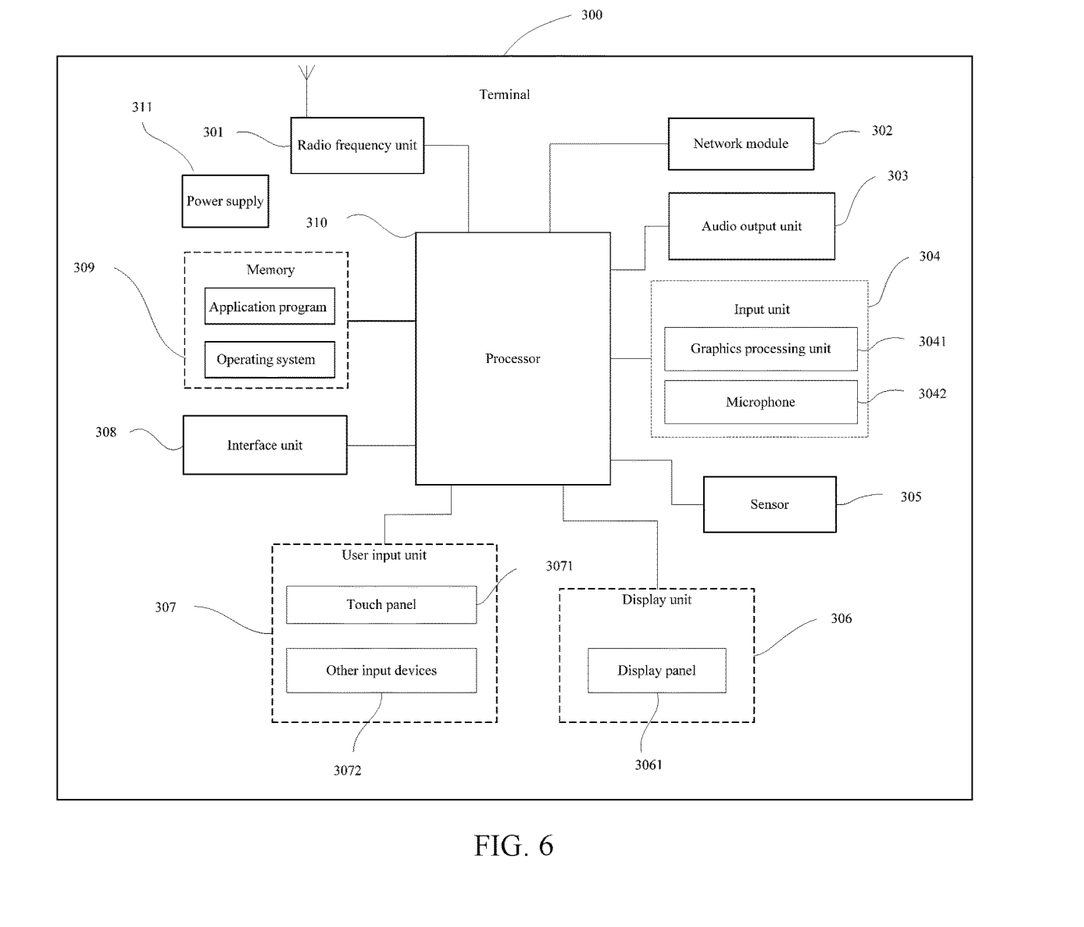
FIG. 6 is a schematic diagram of composition of a terminal according to an embodiment of the present disclosure.

When the communications device is a terminal, as shown in FIG. 6, a terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 310 is configured to receive random access configuration information from a network side device, where the random access configuration information includes at least a random access threshold; and select a random access manner according to the random access configuration information.

In an optional embodiment, the processor 310 is specifically configured to generate a random access parameter, compare the random access parameter with the random access threshold, and select the four-step random access manner or the two-step random access manner according to a comparison result.

In an optional embodiment, the processor 310 is specifically configured to perform at least one of the following: generating a random number as the random access parameter; dividing a terminal identifier exactly by a preset value to obtain the random access parameter; or calculating the random access parameter by using a redistribution formula, where a calculation parameter of the redistribution formula includes at least one of the following: the terminal identifier, the random access threshold, and the random number.

The random access configuration information further includes a priority of the random access manner, and the priority is determined according to at least one of the following: a service requirement, signal quality, a deployment scenario, a cell size, and channel occupancy information.

In an optional embodiment, the processor 310 is specifically configured to use the selected random access manner for $n^{th}$ random access, where n is a positive integer; and after the $n^{th}$ random access fails or is not completed or is unsuccessful, a random access manner for $(n+1)^{th}$ random access is selected according to any one of the following methods:

selecting the same random access manner as that for the $n^{th}$ random access;

selecting a random access manner different from that for the $n^{th}$ random access;

when both of the two random access manners can meet a preset priority requirement, selecting a random access manner different from that for the $n^{th}$ random access;

after the random access manner for the $n^{th}$ random access has been selected for a preset number of times, selecting a random access manner different from that for the $n^{th}$ random access;

after the random access manner for the $n^{th}$ random access has been selected for a preset number of times, when both of the two random access manners can meet a preset priority requirement, selecting a random access manner different from that for the $n^{th}$ random access;

after the random access manner for the $n^{th}$ random access has been executed for a preset time, selecting a random access manner different from that for the $n^{th}$ random access;

after the random access manner for the $n^{th}$ random access has been executed for a preset time, when both of the two random access manners can meet a preset priority requirement, selecting a random access manner different from that for the $n^{th}$ random access;

selecting a random access manner according to the newly generated random access parameter, where the newly generated random access parameter is less than a random access parameter corresponding to the $n^{th}$ random access, and a difference between the two random access parameters is a specified value; or when both of the two random access manners can meet a preset priority requirement, selecting a random access manner according to the newly generated random access parameter, where the newly generated random access parameter is less than a random access parameter corresponding to the $n^{th}$ random access, and a difference between the two random access parameters is a specified value.

The preset priority requirement is preconfigured, or is configured by the network side device.

It should be understood that, in this embodiment of the present disclosure, the radio frequency unit 301 may be configured to receive and send information or receive and send a signal in a call process. Specifically, after receiving downlink data from a base station, the radio frequency unit sends the downlink data to the processor 310 for processing. In addition, the radio frequency unit sends uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may further communicate with another device by using a wireless communications system and network.

The terminal provides a user with wireless broadband Internet access by using the network module 302, for example, helping the user send and receive emails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may further provide an audio output (for example, a call signal receiving sound or a message receiving sound) related to a specific function performed by the terminal 300. The audio output unit 303 includes a speaker, a buzzer, a telephone receiver, etc.

The input unit 304 is configured to receive an audio or video signal. The input unit 304 may include a graphics processing unit (GPU) 3041 and a microphone 3042. The graphics processing unit 3041 processes image data of a still picture or a video obtained by an image capture apparatus (for example, a camera) in a video capture mode or an image capture mode. A processed image frame can be displayed on the display unit 306. The image frame processed by the graphics processing unit 3041 may be stored in the memory 309 (or another storage medium) or sent by using the radio frequency unit 301 or the network module 302. The microphone 3042 may receive a sound and can process such a sound into audio data. The processed audio data may be converted, in a call mode, into a format that can be sent by the radio frequency unit 301 to a mobile communication base station for outputting.

The terminal 300 further includes at least one sensor 305, such as a light sensor, a motion sensor, and other sensors. Specifically, the light sensor includes an ambient light sensor and a proximity sensor, where the ambient light sensor can adjust brightness of a display panel 3061 based on brightness of ambient light, and the proximity sensor can turn off the display panel 3061 and/or backlight when the terminal 300 is moved towards an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information entered by a user or information provided for the user. The display unit 306 may include the display panel 3061, and the display panel 3061 may be configured in a form of a liquid crystal display (LCD), an organic light-emitting diode (OLED), or the like.

The user input unit 307 may be configured to receive input digit or character information and generate a key signal input related to user setting and function control of the terminal. Specifically, the user input unit 307 includes a touch panel 3071 and another input device 3072. The touch panel 3071, also called a touchscreen, may collect a touch operation of the user on or near the touch panel 3071 (for example, an operation performed by the user with any suitable object or accessory such as a finger or a stylus on or near the touch panel 3071). The touch panel 3071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 310, receives a command sent by the processor 310, and executes the command. In addition, the touch panel 3071 may be implemented by using a plurality of types such as a resistive type, a capacitive type, an infrared ray, and a surface acoustic wave. In addition to the touch panel 3071, the user input unit 307 may further include another input device 3072. Specifically, the another input device 3072 may include but is not limited to at least one of a physical keyboard, a functional button (such as a volume control button or a power on/off button), a trackball, a mouse, and a joystick. Details are not described herein.

Further, the touch panel 3071 may cover the display panel 3061. After detecting the touch operation on or near the touch panel 3071, the touch panel 3071 transmits the touch operation to the processor 310 to determine a type of a touch event, and then the processor 310 provides corresponding visual output on the display panel 3061 based on the type of the touch event. Although in FIG. 6, the touch panel 3071 and the display panel 3061 are configured as two independent components to implement input and output functions of the terminal, in some embodiments, the touch panel 3071 and the display panel 3061 can be integrated to implement the input and output functions of the terminal. Details are not limited herein.

The interface unit 308 is an interface for connecting an external apparatus to the terminal 300. For example, the external apparatus may include a wired or wireless headset jack, an external power supply (or a battery charger) port, a wired or wireless data port, a memory card port, a port for connecting an apparatus having an identification module, an audio input/output (I/O) port, a video I/O port, a headset jack, and the like. The interface unit 308 may be configured to receive an input (such as data information, electric power) from the external apparatus and transmit the received input to one or more elements within the terminal 300, or may be configured to transmit data between the terminal 300 and the external apparatus.

The memory 309 may be configured to store software programs and various data. The memory 309 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 309 may include a high-speed random access memory, and may further include a non-volatile memory such as at least one magnetic disk storage component, a flash memory component, or another volatile solid-state storage component.

The processor 310 is a control center of the terminal, and connects all parts of the entire terminal by using various interfaces and lines. By running or executing a software program and/or a module stored in the memory 309 and invoking data stored in the memory 309, the processor 310 performs various functions of the terminal and data processing, to perform overall monitoring on the terminal. The processor 310 may include one or more processing units. Optionally, the processor 310 may be integrated with an application processor and a modem processor. The application processor mainly processes the operating system, the user interface, applications, etc. The modem processor mainly processes wireless communication. It may be understood that alternatively, the modem processor may not be integrated into the processor 310.

The terminal 300 may also include a power supply 311 (for example, a battery) that supplies power to various components. Optionally, the power supply 311 may be logically connected to the processor 310 through a power supply management system, to perform functions of managing charging, discharging, and power consumption through the power supply management system.

In addition, the terminal 300 includes some functional modules not shown. Details are not described herein again.

Figure 7:
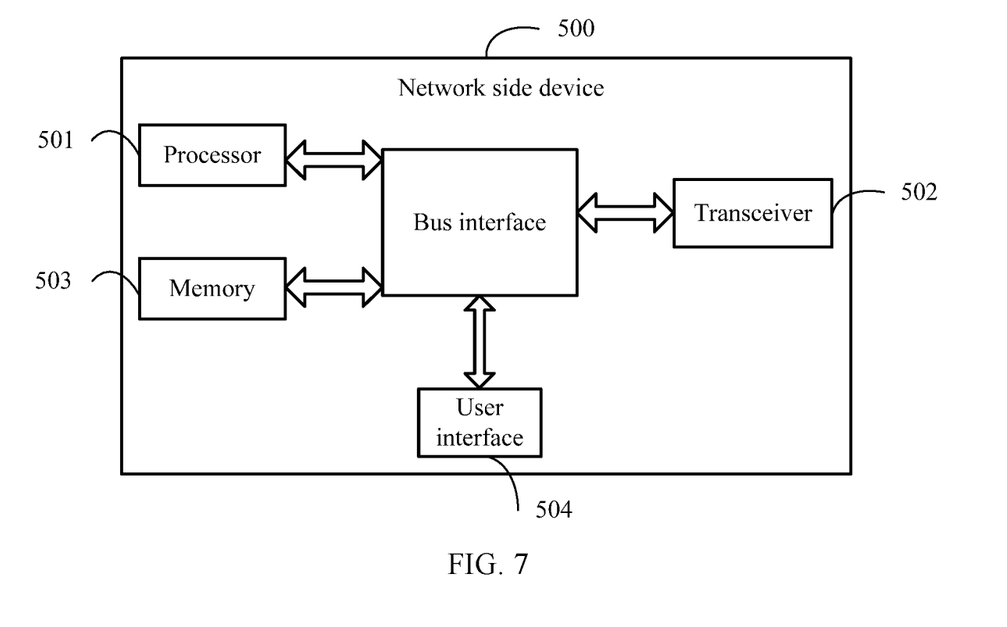
FIG. 7 is a schematic diagram of composition of a network side device according to an embodiment of the present disclosure.

When the communications device is a network side device, as shown in FIG. 7, a network side device 500 includes a processor 501, a transceiver 502, a memory 503, a user interface 504, and a bus interface.

In this embodiment of the present disclosure, the network side device 500 further includes: a computer program that is stored on the memory 503 and capable of running on the processor 501. When the computer program is executed by the processor 501, the following step is implemented: sending random access configuration information to a terminal, where the random access configuration information includes at least a random access threshold.

The random access configuration information further includes a priority of the random access manner, and the priority is determined according to at least one of the following: a service requirement, signal quality, a deployment scenario, a cell size, and channel occupancy information.

In FIG. 7, a bus architecture may include any quantity of interconnected buses and bridges. Specifically, various circuits of one or more processors represented by the processor 501 and a memory represented by the memory 503 are interconnected. The bus architecture may further link together various other circuits such as peripheral devices, voltage regulators, and power management circuits. These are all known in the art, and therefore, no further description is provided herein. The bus interface provides an interface. The transceiver 502 may be a plurality of components. To be specific, the transceiver 502 includes a transmitter and a receiver, and provides a unit configured to communicate with various other apparatuses on a transmission medium. For different user equipment, the user interface 504 may alternatively be an interface for externally and internally connecting a required device. The connected device includes, but not limited to, a keypad, a display, a loudspeaker, a microphone, a joystick, and the like.

The processor 501 is responsible for management on and general processing of the bus architecture. The memory 503 can store data used by the processor 501 during operation execution.

An embodiment of the present disclosure further provides a computer-readable storage medium. The computer-readable storage medium stores a computer program, and when the computer program is executed by a processor, the steps of the foregoing random access method are implemented.

It may be understood that the embodiments described in this specification may be implemented by hardware, software, firmware, middleware, a microcode, or a combination thereof. For implementation with hardware, the processing unit can be implemented in one or more application specific integrated circuits (ASIC), a digital signal processor (DSP), a digital signal processing device (DSP Device, DSPD), a programmable logic device (PLD), a field-programmable gate array (FPGA), general-purpose processors, controllers, micro-controllers, microprocessors, and another electronic unit for implementing the functions of the present application, or their combinations.

For implementation with software, the technology described herein can be implemented by executing modules for functions described herein (for example, process and function). Software code may be stored in the memory and executed by the processor. The memory may be implemented inside or outside the processor.

The embodiments in this specification are described in a progressive manner. Each embodiment focuses on a difference from another embodiment. For a same or similar part of the embodiments, refer to each other.

Those skilled in the art shall understand that the embodiments of the present disclosure can be provided as methods, apparatuses or computer program products. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the methods, user equipment (system), and computer program products thereof. It should be understood that computer program commands can be used to implement each of the procedures and/or blocks in the flowcharts and/or block diagrams, and combinations of procedures and/or blocks in the flowcharts and/or block diagrams. These computer program instructions may be provided for a general-purpose computer, a dedicated computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

Those computer program commands can further be stored a computer readable memory, which can guide the computer or another processor that can program data processing user equipment, to work in a specific away, so that the commands stored in the computer readable memory generate a manufactured product including a command device. The command device implements one or more procedures in the flowchart and/or one or more blocks in the block diagram.

Those computer program commands can further be loaded in a computer or another programmable user equipment, so that a series of steps are executed in the computer or the programmable user equipment to generate processing for computer implementation. Thus, commands executed in the computer or another programmable user equipment provide steps for implementing one or more procedures of the flowchart and/or steps for conducting functions specified in one or more blocks of the block diagram.

Although some optional embodiments in the embodiments of this disclosure have been described, persons skilled in the art can make changes and modifications to these embodiments once they learn the basic inventive concept. Therefore, the appended claims are intended to be interpreted as including the optional embodiments and all changes and modifications that fall within the scope of the embodiments of the present disclosure.

It should further be noted that in this specification, relational terms such as first and second are only used to distinguish one entity or operation from another, and do not necessarily require or imply that any actual relationship or sequence exists between these entities or operations. Moreover, terms "including", "comprising", or any other variants are used to cover non-exclusive inclusion, so that processes, methods, articles or user equipment, each of which includes a series of factors, include not only those factors but also other unlisted factors, or further include other inherent factors of such processes, methods, articles or user equipment. Without more limitations, the factors defined by words "including one . . . " do not exclude that the processes, methods, articles or user equipment including the above-mentioned factors also incorporate other identical factors.

The optional implementations of the present disclosure are described above. It should be noted that a person of ordinary skill in the art may further make some improvements and refinements without departing from the principles described in the present disclosure and these improvements and refinements shall also fall within the protection scope of the present disclosure.

What is claimed is:

1. A random access method, comprising:
receiving, by a terminal, random access configuration information from a network side device, wherein the random access configuration information comprises at least a random access threshold; and
selecting, by the terminal, a random access manner according to the random access configuration information;
wherein after the selecting, by the terminal, a random access manner according to the random access configuration information, the method further comprises:
using, by the terminal, the selected random access manner for $n^{th}$ random access, wherein n is a positive integer; and
after the $n^{th}$ random access fails or is not completed or is unsuccessful, selecting, by the terminal, a random access manner for $(n+1)^{th}$ random access according to any one of the following methods:
when both of the two random access manners can meet a preset priority requirement, selecting a random access manner different from that for the $n^{th}$ random access;
after the random access manner for the $n^{th}$ random access has been selected for a preset number of times, when both of the two random access manners can meet a preset priority requirement, selecting a random access manner different from that for the $n^{th}$ random access;
after the random access manner for the $n^{th}$ random access has been executed for a preset time, when both of the two random access manners can meet a preset priority requirement, selecting a random access manner different from that for the $n^{th}$ random access;
selecting a random access manner according to a newly generated random access parameter, wherein the newly generated random access parameter is less than a random access parameter corresponding to the $n^{th}$ random access, and a difference between the two random access parameters is a specified value; or
when both of the two random access manners can meet a preset priority requirement, selecting a random access manner according to the newly generated random access parameter, wherein the newly generated random access parameter is less than a random access parameter corresponding to the $n^{th}$ random access, and a difference between the two random access parameters is a specified value.

2. The random access method according to claim 1, wherein the random access manner comprises a four-step random access manner and a two-step random access manner, and the selecting, by the terminal, a random access manner according to the random access configuration information comprises:
generating, by the terminal, a random access parameter, comparing the random access parameter with the random access threshold, and selecting the four-step random access manner or the two-step random access manner according to a comparison result.

3. The random access method according to claim 2, wherein the generating, by the terminal, a random access parameter comprises at least one of the following:
generating, by the terminal, a random number as the random access parameter;
dividing, by the terminal, a terminal identifier exactly by a preset value to obtain the random access parameter; or
calculating, by the terminal, the random access parameter by using a redistribution formula, wherein a calculation parameter of the redistribution formula comprises at least one of the following: the terminal identifier, the random access threshold, and the random number.

4. The random access method according to claim 2, wherein the random access configuration information further comprises a priority of the random access manner, and the priority is determined according to at least one of the following: a service requirement, signal quality, a deployment scenario, a cell size, and channel occupancy information.

5. The random access method according to claim 1, wherein the preset priority requirement is preconfigured, or is configured by the network side device.

6. A non-transitory computer-readable storage medium, wherein the computer-readable storage medium stores a computer program, and when the computer program is executed by a processor, the steps of the random access method according to claim 1 are implemented.

7. A communications device, comprising: a memory, a processor, and a computer program that is stored on the memory and capable of running on the processor, wherein when the computer program is executed by the processor, the following steps are implemented:
receiving random access configuration information from a network side device, wherein the random access configuration information comprises at least a random access threshold; and
selecting a random access manner according to the random access configuration information;
wherein after the selecting a random access manner according to the random access configuration information, when the computer program is executed by the processor, the following steps are implemented:
using the selected random access manner for $n^{th}$ random access, wherein n is a positive integer; and after the n$^{th}$ random access fails or is not completed or is unsuccessful, selecting a random access manner for (n+1)$^{th}$ random access according to any one of the following methods:
  when both of the two random access manners can meet a preset priority requirement, selecting a random access manner different from that for the n$^{th}$ random access;
  after the random access manner for the n$^{th}$ random access has been selected for a preset number of times, when both of the two random access manners can meet a preset priority requirement, selecting a random access manner different from that for the n$^{th}$ random access;
  after the random access manner for the n$^{th}$ random access has been executed for a preset time, when both of the two random access manners can meet a preset priority requirement, selecting a random access manner different from that for the n$^{th}$ random access;
  selecting a random access manner according to a newly generated random access parameter, wherein the newly generated random access parameter is less than a random access parameter corresponding to the n$^{th}$ random access, and a difference between the two random access parameters is a specified value; or
  when both of the two random access manners can meet a preset priority requirement, selecting a random access manner according to the newly generated random access parameter, wherein the newly generated random access parameter is less than a random access parameter corresponding to the n$^{th}$ random access, and a difference between the two random access parameters is a specified value.

8. The communications device according to claim 7, wherein the random access manner comprises a four-step random access manner and a two-step random access manner, and the selecting a random access manner according to the random access configuration information comprises:
  generating a random access parameter, comparing the random access parameter with the random access threshold, and selecting the four-step random access manner or the two-step random access manner according to a comparison result.

9. The communications device according to claim 8, wherein the generating a random access parameter comprises at least one of the following:
  generating a random number as the random access parameter;
  dividing a terminal identifier exactly by a preset value to obtain the random access parameter; or
  calculating the random access parameter by using a redistribution formula, wherein a calculation parameter of the redistribution formula comprises at least one of the following: the terminal identifier, the random access threshold, and the random number.

10. The communications device according to claim 8, wherein the random access configuration information further comprises a priority of the random access manner, and the priority is determined according to at least one of the following: a service requirement, signal quality, a deployment scenario, a cell size, and channel occupancy information.

11. The communications device according to claim 7, wherein the preset priority requirement is preconfigured, or is configured by the network side device.

12. A random access method, comprising:
  receiving, by a terminal, random access configuration information from a network side device, wherein the random access configuration information comprises at least a random access threshold; and
  selecting, by the terminal, a random access manner according to the random access configuration information;
  wherein the random access manner comprises a four-step random access manner and a two-step random access manner, and the selecting, by the terminal, a random access manner according to the random access configuration information comprises:
  generating, by the terminal, a random access parameter, comparing the random access parameter with the random access threshold, and selecting the four-step random access manner or the two-step random access manner according to a comparison result;
  wherein the generating, by the terminal, a random access parameter comprises at least one of the following:
  generating, by the terminal, a random number as the random access parameter;
  dividing, by the terminal, a terminal identifier exactly by a preset value to obtain the random access parameter; or
  calculating, by the terminal, the random access parameter by using a redistribution formula, wherein a calculation parameter of the redistribution formula comprises at least one of the following: the terminal identifier, the random access threshold, and the random number.

13. The random access method according to claim 12, wherein the random access configuration information further comprises a priority of the random access manner, and the priority is determined according to at least one of the following: a service requirement, signal quality, a deployment scenario, a cell size, and channel occupancy information.

14. The random access method according to claim 13, wherein after the selecting, by the terminal, a random access manner according to the random access configuration information, the method further comprises:
  using, by the terminal, the selected random access manner for n$^{th}$ random access, wherein n is a positive integer; and
  after the n$^{th}$ random access fails or is not completed or is unsuccessful, selecting, by the terminal, a random access manner for (n+1)$^{th}$ random access according to any one of the following methods:
  selecting the same random access manner as that for the n$^{th}$ random access;
  selecting a random access manner different from that for the n$^{th}$ random access;
  when both of the two random access manners can meet a preset priority requirement, selecting a random access manner different from that for the n$^{th}$ random access;
  after the random access manner for the n$^{th}$ random access has been selected for a preset number of times, selecting a random access manner different from that for the n$^{th}$ random access;
  after the random access manner for the n$^{th}$ random access has been selected for a preset number of times, when both of the two random access manners can meet a preset priority requirement, selecting a random access manner different from that for the n$^{th}$ random access;
  after the random access manner for the n$^{th}$ random access has been executed for a preset time, selecting a random access manner different from that for the n$^{th}$ random access;
  after the random access manner for the n$^{th}$ random access has been executed for a preset time, when both of the two random access manners can meet a preset priority requirement, selecting a random access manner different from that for the $n^{th}$ random access;

selecting a random access manner according to a newly generated random access parameter, wherein the newly generated random access parameter is less than a random access parameter corresponding to the $n^{th}$ random access, and a difference between the two random access parameters is a specified value; or when both of the two random access manners can meet a preset priority requirement, selecting a random access manner according to the newly generated random access parameter, wherein the newly generated random access parameter is less than a random access parameter corresponding to the $n^{th}$ random access, and a difference between the two random access parameters is a specified value.

15. The random access method according to claim 14, wherein the preset priority requirement is preconfigured, or is configured by the network side device.

16. A communications device, comprising: a memory, a processor, and a computer program that is stored on the memory and capable of running on the processor, wherein when the computer program is executed by the processor, the steps of the random access method according to claim 12 are implemented.

17. The communications device according to claim 16, wherein the random access configuration information further comprises a priority of the random access manner, and the priority is determined according to at least one of the following: a service requirement, signal quality, a deployment scenario, a cell size, and channel occupancy information.

18. The communications device according to claim 17, wherein after the selecting a random access manner according to the random access configuration information, when the computer program is executed by the processor, the following steps are implemented:

using the selected random access manner for $n^{th}$ random access, wherein n is a positive integer; and after the $n^{th}$ random access fails or is not completed or is unsuccessful, selecting a random access manner for $(n+1)^{th}$ random access according to any one of the following methods:

selecting the same random access manner as that for the $n^{th}$ random access;

selecting a random access manner different from that for the $n^{th}$ random access;

when both of the two random access manners can meet a preset priority requirement, selecting a random access manner different from that for the $n^{th}$ random access;

after the random access manner for the $n^{th}$ random access has been selected for a preset number of times, selecting a random access manner different from that for the $n^{th}$ random access;

after the random access manner for the $n^{th}$ random access has been selected for a preset number of times, when both of the two random access manners can meet a preset priority requirement, selecting a random access manner different from that for the $n^{th}$ random access;

after the random access manner for the $n^{th}$ random access has been executed for a preset time, selecting a random access manner different from that for the $n^{th}$ random access;

after the random access manner for the $n^{th}$ random access has been executed for a preset time, when both of the two random access manners can meet a preset priority requirement, selecting a random access manner different from that for the $n^{th}$ random access;

selecting a random access manner according to a newly generated random access parameter, wherein the newly generated random access parameter is less than a random access parameter corresponding to the $n^{th}$ random access, and a difference between the two random access parameters is a specified value; or when both of the two random access manners can meet a preset priority requirement, selecting a random access manner according to the newly generated random access parameter, wherein the newly generated random access parameter is less than a random access parameter corresponding to the $n^{th}$ random access, and a difference between the two random access parameters is a specified value.

19. The communications device according to claim 18, wherein the preset priority requirement is preconfigured, or is configured by the network side device.

20. A non-transitory computer-readable storage medium, wherein the computer-readable storage medium stores a computer program, and when the computer program is executed by a processor, the steps of the random access method according to claim 12 are implemented.

* * * * *